(12) United States Patent
Shih

(10) Patent No.: US 8,611,444 B2
(45) Date of Patent: Dec. 17, 2013

(54) RECEIVER AND SIGNAL RECEIVING METHOD THEREOF

(75) Inventor: Shih-Yi Shih, Hsin-Chu (TW)

(73) Assignee: Infomax Communication Co., Ltd., Hsinchu (TW)

( * ) Notice: Subject to any disclaimer, the term of this patent is extended or adjusted under 35 U.S.C. 154(b) by 55 days.

(21) Appl. No.: 13/166,787

(22) Filed: Jun. 22, 2011

(65) Prior Publication Data
US 2012/0328054 A1   Dec. 27, 2012

(51) Int. Cl.
*H04K 1/10* (2006.01)
*H04L 27/28* (2006.01)

(52) U.S. Cl.
USPC .......................... 375/260; 375/261; 375/262

(58) Field of Classification Search
USPC .......................... 375/260, 261, 340, 341, 295
See application file for complete search history.

(56) References Cited

U.S. PATENT DOCUMENTS

| | | | | |
|---|---|---|---|---|
| 2004/0081074 | A1* | 4/2004 | Piechocki | 370/206 |
| 2009/0060016 | A1* | 3/2009 | Liu | 375/229 |
| 2009/0168811 | A1* | 7/2009 | Seyama et al. | 370/537 |
| 2009/0268825 | A1* | 10/2009 | Sakai et al. | 375/260 |
| 2011/0075651 | A1* | 3/2011 | Jia et al. | 370/344 |
| 2012/0328054 | A1* | 12/2012 | Shih | 375/340 |

OTHER PUBLICATIONS

Z. Zhang et al., "A Decision-Aided Residual ISI Cancellation Algorithm for OFDM Systems", 2006 8th International Conference on Signal Processing, Nov. 16-20, 2006.

M. Yoshida et al., "An LDPC-coded OFDM receiver with pre-FFT iterative equalizer for ISI channels", 2005 Vehicular Technology Conference, VTC 2005-Spring. 2005 IEEE 61st, May 30-Jun. 1, 2005, vol. 2, pp. 767-772.

Z. Yang et al., "A novel residual ISI cancellation for OFDM system with applications to wireless LAN", IET International Conference on Wireless Mobile and Multimedia Networks Proceedings (ICWMMN 2006), Hangzhou, China, Nov. 6-9, 2006.

S. Armour et al., "Performance analysis of a pre-FFT equalizer design for DVB-T", IEEE Transactions on Consumer Electronics, vol. 45, No. 3, Aug. 1999. pp. 544-552.

X. Wang et al., "Robust channel estimation and ISI cancellation for OFDM systems with suppressed features", IEEE Journal on Selected Areas in Communications, vol. 23, No. 5, May 2005, pp. 963-972.

* cited by examiner

*Primary Examiner* — Qutbuddin Ghulamali
(74) *Attorney, Agent, or Firm* — Rabin & Berdo, P.C.

(57) ABSTRACT

A signal receiving method of a receiver includes the following steps. A time-domain received signal is transformed into a frequency-domain received signal, which includes multiple pilot symbols and multiple data symbols. Multiple channel impulse responses corresponding to the pilot symbols are estimated. Multiple inter-carrier interference and inter-block interference (ICIIBI) values corresponding to the pilot symbols are estimated based on the pilot symbols and the corresponding channel impulse responses. Multiple ICIIBI values corresponding to the data symbols are obtained via an interpolation operation according to the ICIIBI values corresponding to the pilot symbols. The estimated corresponding ICIIBI values are cancelled from the data symbols. The interference-cancelled data symbols are demapped to obtain soft-decision or hard-decision bits.

7 Claims, 2 Drawing Sheets

RECEIVER AND SIGNAL RECEIVING METHOD THEREOF

BACKGROUND

1. Technical Field

The invention relates in general to a receiver and a signal receiving method thereof.

2. Background

The orthogonal frequency division multiplexing (OFDM) modulation technology can be used in wireless communication systems and digital audio and video broadcasting systems to perform high spectral efficiency transmission. Based on the OFDM modulation technology for the multi-carrier modulation, the effective processing ability is obtained with respect to the multi-path reflection effect. Therefore, a receiver in the OFDM system only needs one simple one-tap. So, the OFDM system has recently become the mainstream technology in the communication field and the broadcasting application development. Various systems, such as the digital audio broadcasting (DVB), the high definition TV (HDTV) and the wireless local area network (WLAN) IEEE 802.11a/g, use the OFDM transmission technology.

In the wireless communication system, a transmitter transmits wireless signals to a receiver through a physical channel, such as air, in the form of electromagnetic waves. Due to the non-ideal channel effect, such as multi-path reflection and multi-path fading, the wireless signals received by the receiver may get distorted. Inter-symbol interference (ISI) caused by the multi-path channel can be easily cancelled by adding a guard interval (GI) with longer duration than duration of a channel impulse response to the symbols. However, if the multi-path signal received by the receiver has a larger delay spread, the duration of the channel impulse response will be longer than the duration of the GI, thus a residual ISI effect is caused and the system performance is reduced.

In addition, an inter-carrier interference (ICI) effect is caused when the orthogonality of the sub-carriers is destroyed, and the system performance is reduced likewise. Therefore, it is an important issue in the field to solve the reduced system performance problem caused by the residual ISI and ICI without increasing the system computation complexity.

SUMMARY

According to a first aspect of the present disclosure, a receiver is provided. The receiver includes a demodulation unit, a channel estimator, an inter-carrier interference and inter-block interference (ICIIBI) estimation unit, a finite impulse response filter, an adder and a demapper. The demodulation unit transforms a time-domain received signal into a frequency-domain received signal, which includes multiple pilot symbols and multiple data symbols. The channel estimator estimates multiple channel impulse responses corresponding to the pilot symbols. The ICIIBI estimation unit estimates multiple ICIIBI values corresponding to the pilot symbols based on the pilot symbols and the corresponding channel impulse responses. The finite impulse response filter obtains multiple ICIIBI values corresponding to the data symbols via an interpolation operation according to the ICIIBI values corresponding to the pilot symbols. The adder cancels the estimated corresponding ICIIBI values from the data symbols. The demapper computes bit log-likelihood ratios (LLRs) or hard decision from the interference-cancelled data symbols.

According to a second aspect of the present disclosure, a signal receiving method of a receiver is provided. A time-domain received signal is transformed into a frequency-domain received signal, which includes multiple pilot symbols and multiple data symbols. Multiple channel impulse responses are estimated corresponding to the pilot symbols. Multiple ICIIBI values corresponding to the pilot symbols are estimated based on the pilot symbols and the corresponding channel impulse responses. Multiple ICIIBI values corresponding to the data symbols are obtained via an interpolation operation according to the ICIIBI values corresponding to the pilot symbols. The estimated corresponding ICIIBI values are cancelled from the data symbols. The interference-cancelled data symbols are then sent to a demapper.

The invention will become apparent from the following detailed description of the preferred but non-limiting embodiments. The following description is made with reference to the accompanying drawings.

DETAILED DESCRIPTION OF THE INVENTION

The disclosure provides a receiver and a signal receiving method thereof, capable of removing residual inter-symbol interference (ISI) and inter-carrier interference (ICI) of each symbol by estimating inter-carrier interference and inter-block interference (ICIIBI) values corresponding to multiple pilot symbols and obtaining multiple ICIIBI values corresponding to multiple data symbols via an interpolation operation, thus reducing the computation complexity and keeping the overall system performance.

Figure 1:
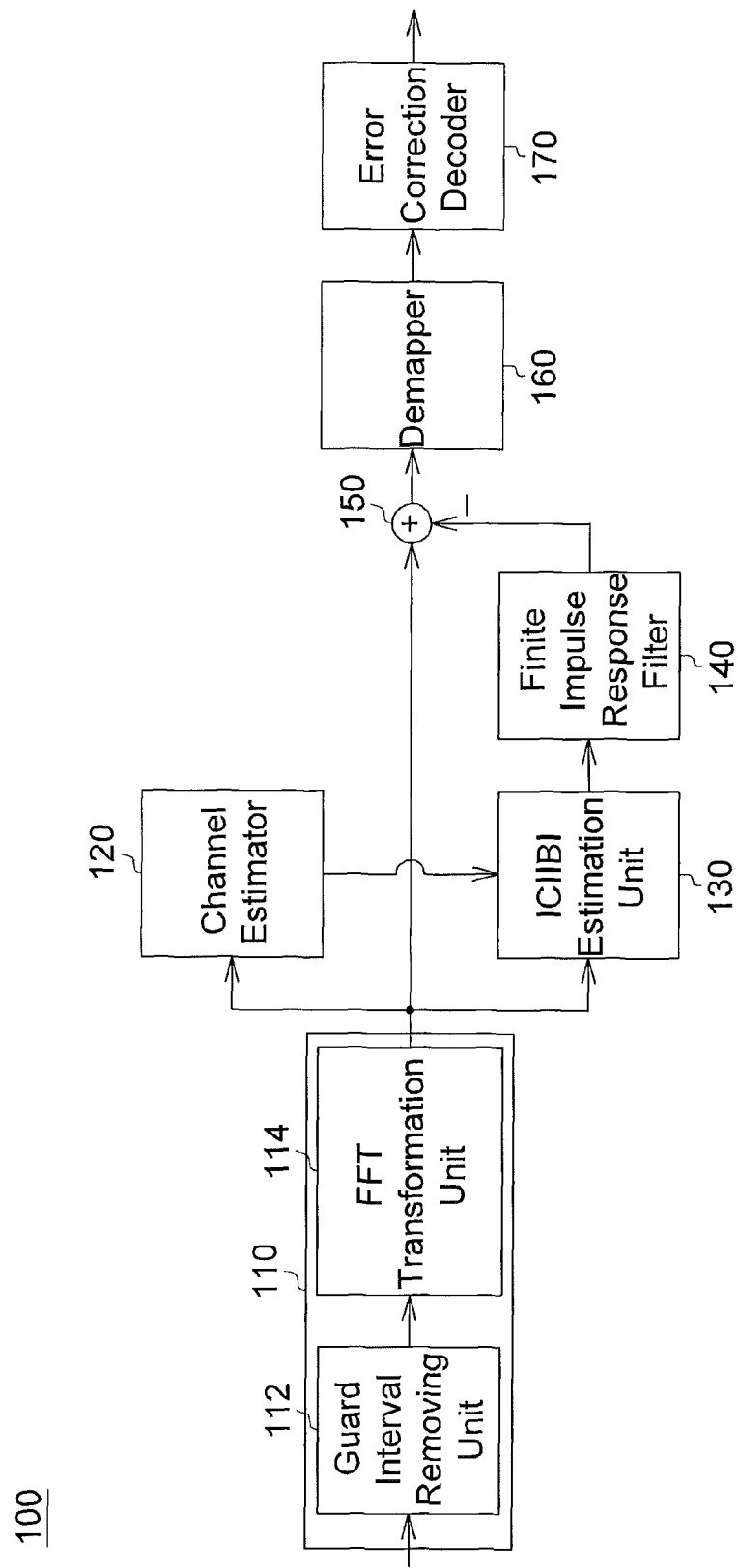
FIG. 1 shows a block diagram illustrating a receiver according to an embodiment.

Referring to FIG. 1, a block diagram illustrating a receiver according to an embodiment is shown. The receiver 100 includes a demodulation unit 110, a channel estimator 120, an ICIIBI estimation unit 130, a finite impulse response filter 140, an adder 150, a demapper 160 and an error correction decoder 170. The error correction decoder 170 is an optional element. The demodulation unit 100 receives a time-domain received signal. The demodulation unit 100 includes a guard interval (GI) removing unit 112 and a Fast Fourier Transform (FFT) transformation unit 114. The GI removing unit 112 is used for removing GIs of multiple useful symbols of the time-domain received signal. The FFT transformation unit 114 is used for transforming the GI-removed time-domain received signal into a frequency-domain signal. The frequency-domain signal includes multiple pilot symbols and multiple data symbols.

In the embodiment, channel noise is not considered for analysis simplicity. When duration of a channel impulse response is longer than duration of the GI, the frequency-domain received signal substantially includes products of transmission data corresponding to the time-domain received signal at a transmitting end and the channel impulse responses, and ICIIBI values corresponding to all the symbols. Assume that $T_G$ represents the duration of the GI, G represents the block size of the GI, $\tau_{max}$ represents the duration of the channel impulse response, N represents the block size of FFT. Then, the $n^{th}$ transmitted symbol block is $S(n)=$ $[S_{n,0}, S_{n,0}, \ldots, S_{n,N-1}]^T$, the $n^{th}$ received symbol block is $R(n)=[R_{n,0}, R_{n,0}, \ldots, R_{n,N-1}]^T$, and the channel response is $$h(\tau) = \sum_{l=0}^{L-1} h_l \delta(\tau - \tau_l), \tau_0 < \tau_1 < \ldots < \tau_{L-1} = \tau_{max}.$$

Further assume that $T_s$ represents a sample interval, then $\tau_l/T_s = i_l + \epsilon_l$, $i_l$ is integer part, and $\epsilon_l$ is decimal part. When the duration $T_G$ of the GI is shorter than the duration $\tau_{max}$ of the channel impulse response, the frequency-domain received signal $R_{n,k}$ for the $k^{th}$ symbol of the $n^{th}$ received symbol block is shown as the equation (1).

$$R_{n,k} = S_{n,k} \sum_{m=0}^{L-1} (h_m W^{km}) - ICI_{n,k} + IBI_{n,k} \quad (1)$$
$$= S_{n,k} \sum_{m=0}^{L-1} (h_m W^{km}) + IBIICI_{n,k}$$

wherein, $$ICIIBI_{n,k} = IBI_{n,k} - ICI_{n,k}$$
$$= \sum_{m=0}^{L-G-2} ibi_{n,m} \exp\left(-j\frac{2\pi mk}{N}\right) - \sum_{m=0}^{L-G-2} ici_{n,m} \exp\left(-j\frac{2\pi mk}{N}\right),$$

$$k = 0, \ldots, N-1$$
$$ibi_{n,m} = \sum_{l=1}^{L-G-1-m} h_{G+l+m} S_{n-1,N-l}, m = 0, \ldots, L-G-2$$
$$ici_{n,m} = \sum_{l=1}^{L-G-1-m} h_{G+l+m} S_{n,N-G-l}, m = 0, \ldots, L-G-2$$

It is obtained from the equation (1) that, estimation data corresponding to the time-domain received signal can be obtained as long as the ICIIBI value corresponding to each symbol can be estimated and then cancelled from the frequency-domain received signal to be demapped on the premise that the ICIIBI corresponding to each symbol is regarded as a whole in the embodiment.

Therefore, the channel estimator 120 is used for estimating multiple channel impulse responses corresponding to the pilot symbols. The ICIIBI estimation unit 130 is used for estimating multiple ICIIBI values corresponding to the pilot symbols based on the pilot symbols and the corresponding channel impulse responses. The finite impulse response filter 140 is used for obtaining multiple ICIIBI values corresponding to the data symbols via an interpolation operation according to the ICIIBI values corresponding to the pilot symbols. The adder cancels the estimated corresponding ICIIBI values from the data symbols. Because the response of the finite impulse response filter 140 to any impulse input signal settles to zero, the impulse response is of finite duration, so that the output digital signal is of finite duration. Hence, the finite impulse response filter 140 may be utilized to obtain the ICIIBI values corresponding to the pilot symbols, and then the ICIIBI values corresponding to the data symbols can be obtained via the interpolation operation based on the characteristic of finite duration, thus decreasing the overall computation complexity.

The adder 150 is used for cancelling the estimated corresponding ICIIBI values from the data symbols. The demapper 160 is used for demapping the interference-cancelled data symbols to obtain the estimation data corresponding to the time-domain received signal. The error correction decoder 170, substantially an optional element, is used for performing error detection and correction operations on the estimation data. The error correction decoder 170 is, for example, a low-density parity check (LDPC) decoder or a forward error correction (FEC) decoder, but it is not limited thereto and decided according to the design of the transmitting end.

Figure 2:
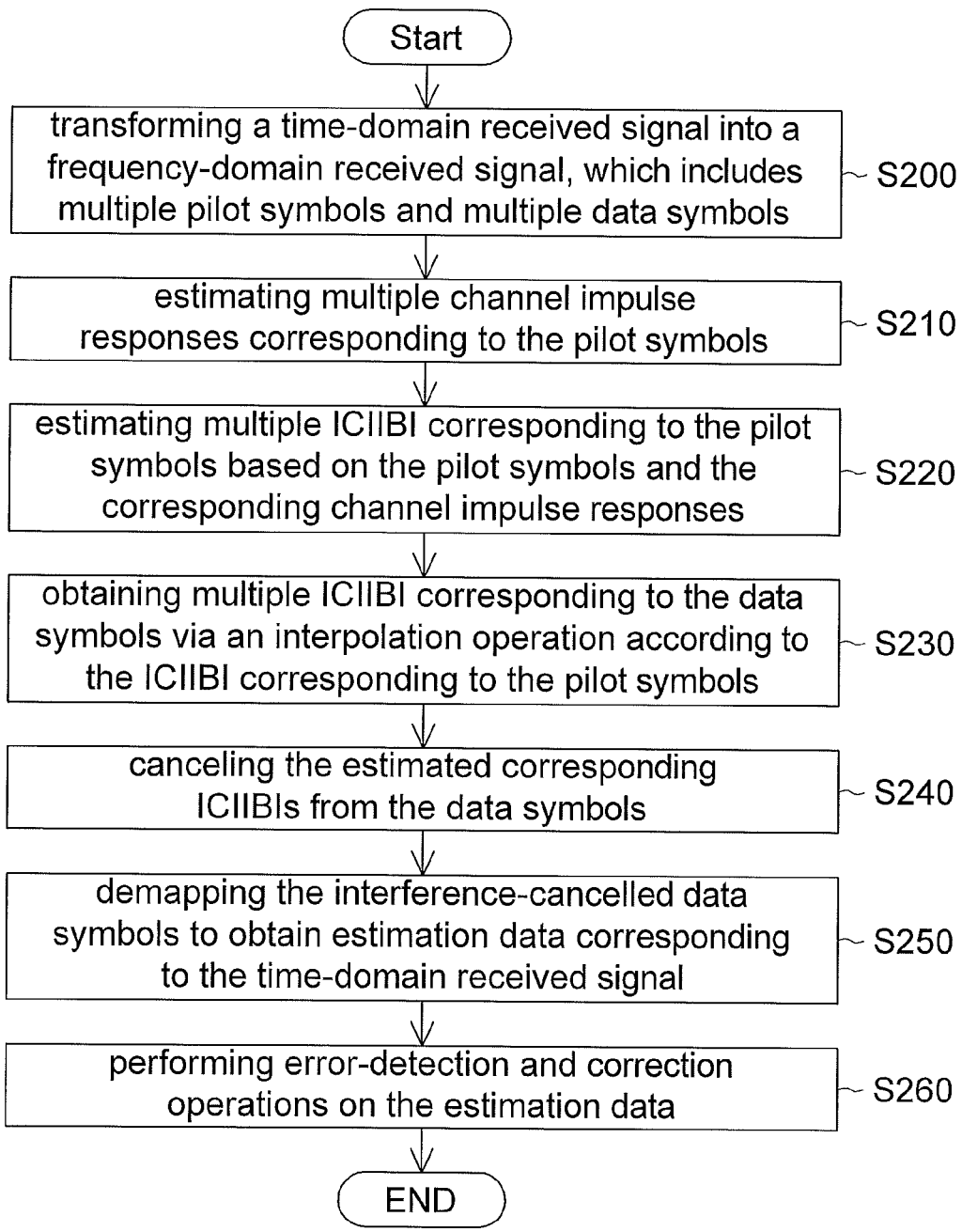
FIG. 2 shows a flow chart illustrating a signal receiving method of a receiver according to an embodiment.

The embodiment further provides a signal receiving method of a receiver, which is applied to the receiver 100 shown in FIG. 1 for example. Referring to FIG. 2, a flow chart illustrating a signal receiving method according to an embodiment is shown. In step S200, a time-domain received signal is transformed into a frequency-domain received signal, which includes multiple pilot symbols and multiple data symbols. In step S210, multiple channel impulse responses are estimated corresponding to the pilot symbols. In step S220, multiple ICIIBI values corresponding to the pilot symbols are estimated based on the pilot symbols and the corresponding channel impulse responses. In step S230, multiple ICIIBI values corresponding to the data symbols are obtained via an interpolation operation according to the ICIIBI values corresponding to the pilot symbols. In step S240, the estimated corresponding ICIIBI values are cancelled from the data symbols. In step S250, the interference-cancelled data symbols are demapped to obtain estimation data corresponding to the time-domain received signal. In step S260, error detection and correction operations are performed on the estimation data.

The detailed principles of the above signal receiving method of a receiver have been described in the receiver 100 and related descriptions, so detailed description thereof will be omitted.

The receiver and the signal receiving method thereof disclosed in the disclosure are capable of removing residual inter-symbol interference (ISI) and inter-carrier interference (ICI) of each symbol by estimating the ICIIBI values corresponding to multiple pilot symbols and obtaining multiple ICIIBI values corresponding to multiple data symbols via an interpolation operation, thus reducing the computation complexity and keeping the overall system performance.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A receiver, comprising:
    a demodulation unit for transforming a time-domain received signal into a frequency-domain received signal that comprises a plurality of pilot symbols and a plurality of data symbols;
    a channel estimator for estimating a plurality of channel impulse responses corresponding to the pilot symbols;
    an inter-carrier interference and inter-block interference (ICIIBI) estimation unit for estimating a plurality of ICIIBI values corresponding to the pilot symbols based on the pilot symbols and the corresponding channel impulse responses;
    a finite impulse response filter for obtaining a plurality of ICIIBI values corresponding to the data symbols via an interpolation operation according to the ICIIBI values corresponding to the pilot symbols;

an adder for cancelling the ICIIBI values corresponding to the data symbols from the data symbols; and a demapper for demapping the interference-cancelled data symbols to obtain estimation data corresponding to the time-domain received signal.

2. The receiver according to claim 1, wherein the demodulation unit comprises:

a guard interval removing unit for removing a plurality of guard intervals of the time-domain received signal; and a Fast Fourier Transform (FFT) transformation unit for transforming the guard-interval-removed time-domain signal into the frequency-domain received signal.

3. The receiver according to claim 1, further comprising:

an error correction decoder for performing error-detection and correction operations on the estimation data.

4. The receiver according to claim 3, wherein the error correction decoder is a low-density parity check decoder or a forward error correction decoder.

5. A signal receiving method of a receiver, comprising:

transforming a time-domain received signal into a frequency-domain received signal that comprises a plurality of pilot symbols and a plurality of data symbols;

estimating a plurality of channel impulse responses corresponding to the pilot symbols;

estimating a plurality of ICIIBI values corresponding to the pilot symbols based on the pilot symbols and the corresponding channel impulse responses;

obtaining a plurality of ICIIBI values corresponding to the data symbols via an interpolation operation according to the ICIIBI values corresponding to the pilot symbols;

cancelling the ICIIBI values corresponding to the data symbols from the data symbols; and demapping the interference-cancelled data symbols to obtain estimation data corresponding to the time-domain received signal.

6. The signal receiving method according to claim 5, further comprising:

removing a plurality of guard intervals of the time-domain received signal; and transforming the guard-interval-removed time-domain signal into the frequency-domain received signal.

7. The signal receiving method according to claim 5, further comprising:

performing error-detection and correction operations on the estimation data.

* * * * *